United States Statutory Invention Registration [19]

[11] Reg. Number: H527

Vanderplaats [43] Published: Sep. 6, 1988

[54] GYRO-TWT STABILIZATION METHOD USING COUPLED LOSSY WAVEGUIDE

[75] Inventor: Norman R. Vanderplaats, Alexandria, Va.

[73] Assignee: United States of America, Washington, D.C.

[21] Appl. No.: 158,506

[22] Filed: Feb. 22, 1988

[51] Int. Cl.[4] ..... H01J 25/50

[52] U.S. Cl. ..... 315/5.13

*Primary Examiner*—Stephen C. Buczinski
*Assistant Examiner*—Linda J. Wallace
*Attorney, Agent, or Firm*—Thomas E. McDonnell; George Jameson

[57] ABSTRACT

A frequency-selective stabilization system for a gyrotron traveling wave tube amplifier using a dielectrically loaded lossy auxiliary waveguide coupled to the interaction waveguide of the gyrotron traveling wave tube. The auxiliary waveguide has its cutoff frequency in the range of that of the interaction waveguide where instability is likely to occur, but has a significantly different dielectric constant, which lets it absorb stray oscillations in the range of the interaction waveguide cutoff frequency without significant interaction loss in the range of the operating frequency.

19 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GYRO-TWT STABILIZATION METHOD USING COUPLED LOSSY WAVEGUIDE

BACKGROUND OF THE INVENTION

The invention is directed to gyrotron traveling wave tube amplifiers (gyro-TWTs), and particularly to arrangements for preventing oscillations near the cutoff frequency of the waveguide interaction structure in such gyro-TWTs.

The gyro-TWT is a relatively new type of amplifier in which an electron beam with a large component of velocity transverse to the axial direction of travel interacts with the transverse components of RF electric field in a waveguide to provide amplified power output. To obtain maximum gain and power, the value of magnetic field should be adjusted so that the relativistic cyclotron frequency is slightly below the waveguide cutoff frequency or to a subharmonic of this frequency. This is prevented by a tendency for parasitic oscillations to occur in the range of the waveguide cutoff frequency, where both forward and backward wave interaction can occur and where the low group velocity causes the interaction impedance to be very high. Present methods to reduce oscillations include (1) detuning the magnetic field to avoid synchronism with the waveguide cutoff frequency, (2) reducing the beam current, (3) reducing the transverse velocity, and (4) use of lossy coatings such as carbon or Kanthal (an Fe-Cr-Al-Co alloy) to increase circuit RF loss. All of these present methods have features which limit the gain, power, and efficiency.

OBJECTS OF THE INVENTION

Accordingly, it is an object of this invention to increase power, bandwidth and efficiency in gyro-TWTs using uniform or axially tapered interaction circuits.

Another object of this invention is to prevent oscillations in gyro-TWTs.

Still another object of this invention is to implement frequency-selective loss near the cutoff frequency of the gyro-TWT interaction circuit waveguide while minimizing radio frequency (RF) loss above the cutoff frequency.

SUMMARY OF THE INVENTION

These and other objects of the invention are attained by coupling a high-loss auxiliary waveguide to an interaction circuit waveguide which has a similar cutoff frequency but a much higher effective dielectric constant. Because of the difference in dielectric constants between these waveguides, the auxiliary waveguide only absorbs power from the interaction circuit waveguide in the range of the waveguide cutoff frequency.

DESCRIPTION OF THE INVENTION

Figure 1:
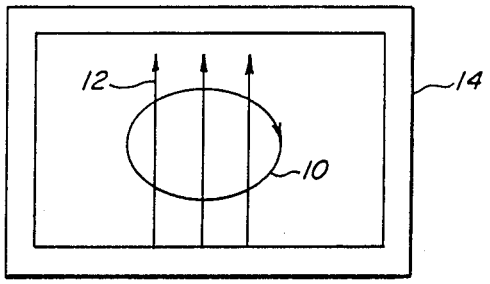
FIG. 1 is a cross-sectional view of the interaction circuit waveguide of a typical gyrotron tube.

Referring to the drawings, wherein like reference characters designate like or corresponding parts throughout the views, FIG. 1 shows an end view of a typical gyrotron tube interaction circuit. An electron beam 10 rotating at the cyclotron frequency interacts with electric fields 12 of a waveguide-type interaction circuit or interaction waveguide 14 to provide amplified RF power as the beam moves axially.

Figure 2:
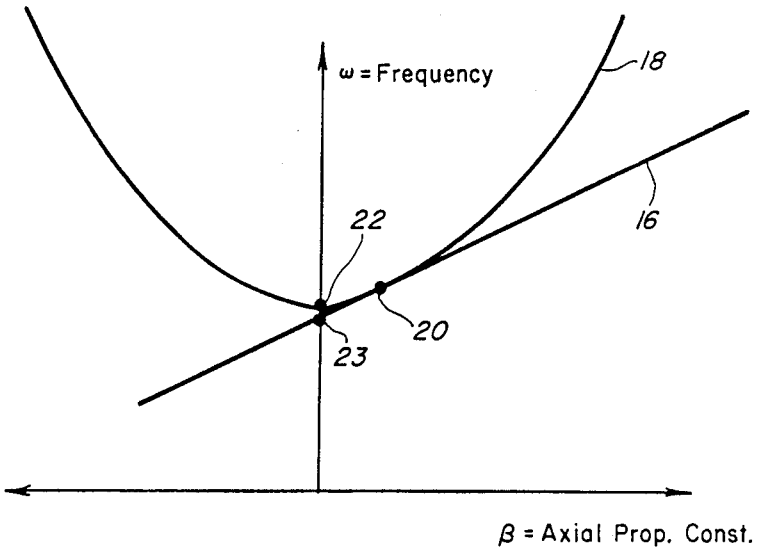
FIG. 2 is a graphical representation of the gyrotron interaction circuit waveguide and cyclotron electron beam frequencies as a function of axial propagation constant.

Dispersion curves of the electron beam 10 and interaction waveguide 14 as a function of axial propagation constant $\beta$ are shown in FIG. 2. Curve 16 represents electron beam 10 frequency, shifted upward by the electron cyclotron frequency, as a function of axial propagation constant. Curve 18 represents the frequency of interaction waveguide 14 as a function of the axial propagation constant. Synchronism between the electron beam 10 and interaction waveguide 14 occurs at frequency $\omega_t$ where curves 16 and 18 intersect, represented by point 20. However, parasitic oscillations tend to occur at frequencies in the range of the interaction waveguide 14 cutoff frequenc $\omega_o$, represented by point 22. These parasitic osc can only be eliminated by reducing the beam transverse velocity or shifting the cyclotron frequency $\omega_c$, represented by point 23, further from $\omega_o$ by decreasing the magnetic field, in either case reducing amplifier efficiency.

Figure 3:
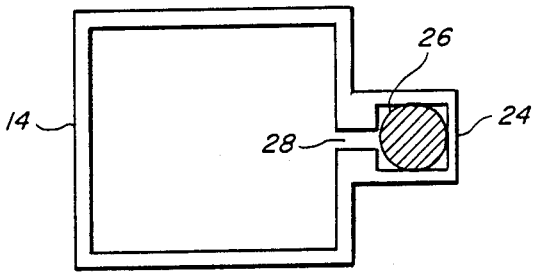
FIG. 3 is a cross-sectional view of the lossy auxiliary waveguide coupled to the interaction circuit waveguide according to the invention.

A cross-sectional view of the preferred embodiment of the invention is shown in FIG. 3. An auxiliary waveguide 24 containing a lossy dielectric material 26 is coupled to the interaction waveguide 14 discussed above by a well known waveguide coupling 28, which may be, by way of example, a coupling slot or a series of coupling apertures between the walls of interaction waveguide 14 and auxiliary waveguide 24. In this case, coupling of power between the interaction waveguide 14 and auxiliary waveguide 24 occurs via a common axial magnetic field component through the coupling 28. The ends of the auxiliary waveguide 24 should extend slightly beyond the ends of the interaction region of the interaction waveguide 14. The ends of the auxiliary waveguide 24 should be terminated with well known RF attenuator loads.

Although FIG. 3 illustrates sidewall coupling of two rectangular waveguides both in the $TE_{10}$ (transverse electric) mode, either circular or rectangular waveguides can be employed with either sidewall or topwall coupling using either the TE or TM modes. Also, a plurality of lossy auxiliary waveguides can be employed to maintain symmetry or increase the RF loss. Some examples of suitable alternatives are shown in FIGS. 4 and 5.

Figure 4:
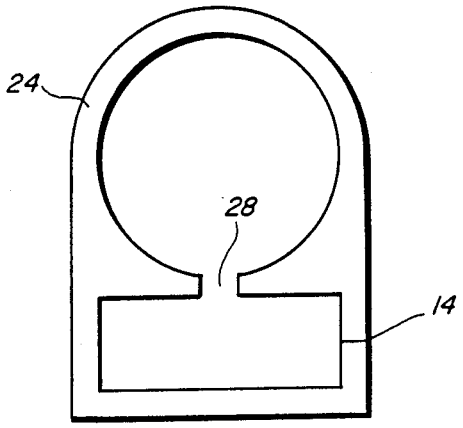
FIG. 4 is a cross-sectional view of one example of an alternately configured interaction circuit waveguide, lossy circuit waveguide and coupling between them according to the invention.
Figure 5:
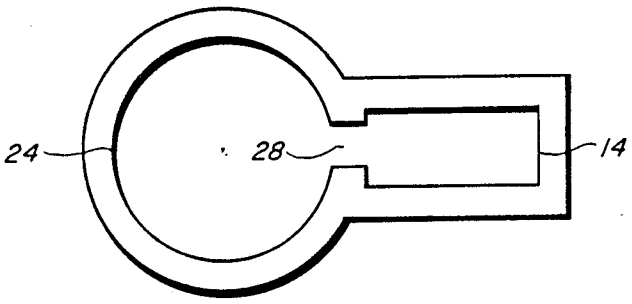
FIG. 5 is a cross-sectional view of another example of an alternately configured interaction circuit waveguide, lossy circuit waveguide and coupling between them according to the invention.

FIG. 4 shows topwall coupling of a lossy dielectric filled auxiliary circular waveguide 24 in the $TM_{01}$ mode to a rectangular interaction waveguide 14 in the $TE_{10}$ mode. FIG. 5 shows sidewall coupling from a lossy dielectric filled circular auxiliary waveguide 24 in the $TE_{01}$ mode to a rectangular interaction waveguide 14 in the $TE_{10}$ mode. Similarly, other combinations and configurations may be used with the present invention, as will be apparent to those skilled in the art.

Figure 6:
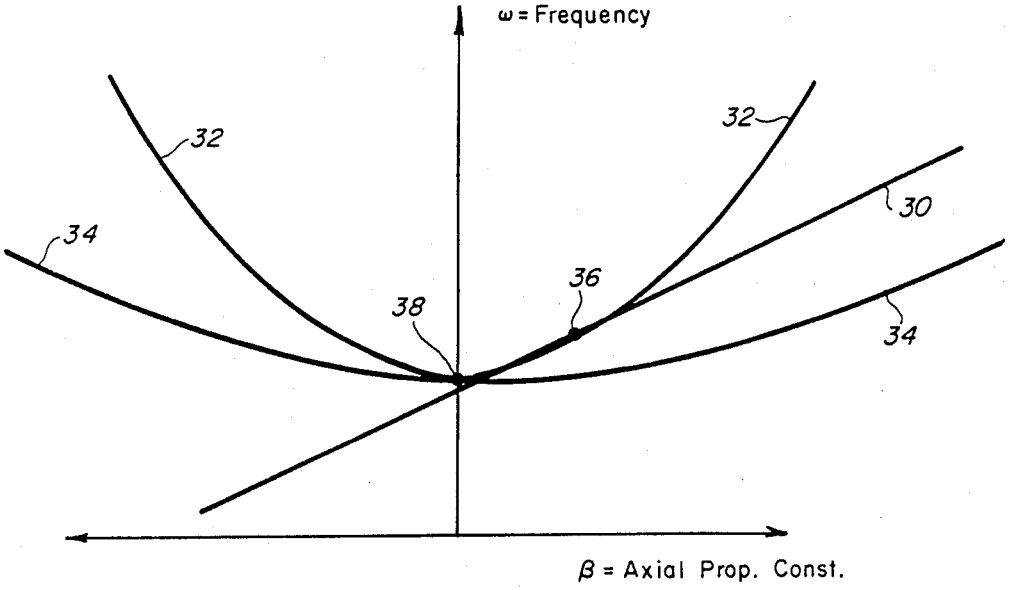
FIG. 6 is a graphical representation of the gyrotron interaction circuit waveguide, auxiliary waveguide and cyclotron shifted electron beam frequencies as a function of axial propagation constant.

Dispersion curves for the above-described electron beam 10, interaction waveguide 14 and auxiliary waveguide 24 are shown in FIG. 6 for the case of no loss or coupling between the interaction waveguide 14 and auxiliary waveguide 24. Curve 30 represents the electron beam 10 cyclotron shifted frequency as a function of axial propagation constant. Curve 32 represents interaction waveguide 14 frequency as a function of axial propagation constant. Curve 34 represents auxiliary waveguide 24 frequency as a function of axial propagation constant.

The principle and methodology of the invention is evident by close inspection of FIG. 6. As is well known in the art, synchronism between the electron beam and waveguide circuit in a gyro-TWT occurs at a frequency $\omega_t$, represented by point 36, where the interaction waveguide curve 32 intersects the cyclotron shifted electron beam curve 30. Frequency $\omega_t$ is very close to the interaction waveguide cutoff frequency $\omega_o$, represented by point 38, which tends to induce parasitic oscillations, because at frequency $\omega_o$ both forward and backward wave interaction can occur and the low group velocity causes the interaction impedance to be very high. Consequently, the auxiliary waveguide 24 is coupled to the interaction waveguide 14 via the waveguide coupling 28, and has sufficient internal loss to absorb energy from the interaction waveguide 14, preventing parasitic oscillations from occurring in the range of frequencies close to $\omega_o$. The auxiliary waveguide 24 has its cutoff frequency tuned to nearly match that of the interaction waveguide 14, so as to maximize coupling between them at their mutual cutoff frequency $\omega_o$. The auxiliary waveguide 24 is selected to have a significantly different dielectric constant than the interaction waveguide 14 so that coupling only occurs about their mutual cutoff frequency $\omega_o$. This is apparent in FIG. 6, where it may be noted that the interaction waveguide curve 32 only intersects the auxiliary waveguide curve 34 at frequency $\omega_o$, represented by point 38.

At frequency $\omega_o$, the axial propagation constants of interaction waveguide 14 and auxiliary waveguide 24 are closely matched, and coupling between them is correspondingly high. However, at the gyro-TWT operating frequency $\omega_t$, represented by point 36, the interaction waveguide curve 32 and auxiliary waveguide curve 34 are significantly deviated from each other, indicating that their axial propagation constants are greatly different, and therefore coupling between interaction waveguide 14 and auxiliary waveguide 24 are minimal at the operating frequency $\omega_t$. In consequence, the auxiliary waveguide 24 only absorbs energy from the interaction waveguide 14 in the range of its cutoff frequency $\omega_o$ where parasitic oscillations are likely to occur, and not at the operating frequency $\omega_t$, where the attenuation of the auxiliary waveguide 24 would hamper operating efficiency and performance of the gyro-TWT.

Figure 7:
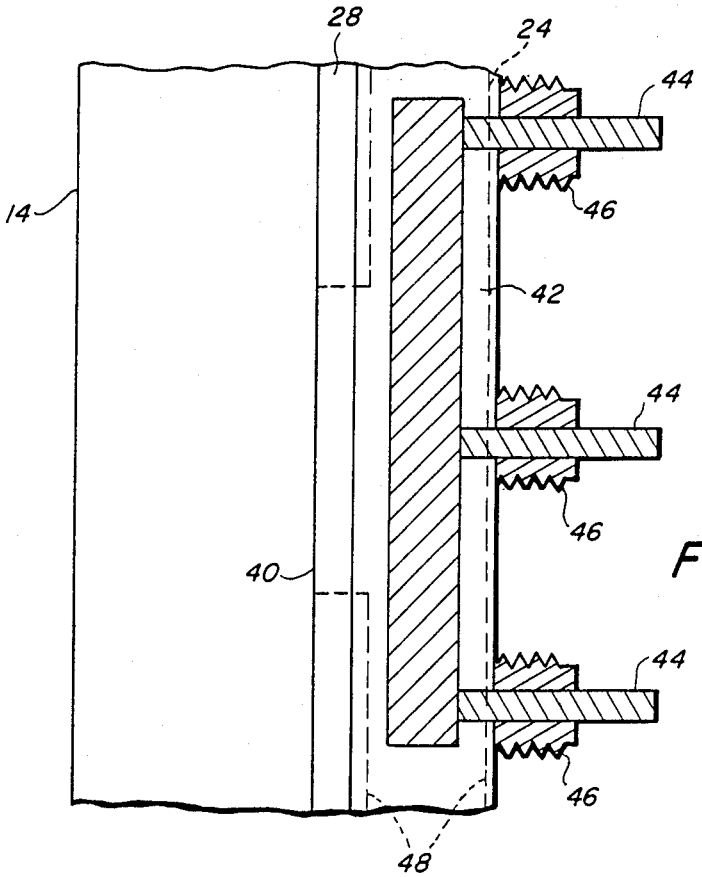
FIG. 7 is a cross-sectional view of the auxiliary waveguide coupled to the interaction circuit waveguide according to the invention, including provisions for adjusting the dielectric constant and degree of coupling of the auxiliary waveguide.

Adjustability of both the effective dielectric constant and the degree of coupling between the interaction waveguide 14 and the auxiliary waveguide 24 is desirable to introduce as little insertion loss as possible to maintain amplifier stability. One example of means for adjusting the effective dielectric constant and coupling to the auxiliary waveguide 24 is shown in FIG. 7. Coupling between the interaction waveguide 14 and the auxiliary waveguide 24 via the waveguide coupling 28 as discussed above may be adjusted by changing the exposed area of the coupling slot 40 in the coupler 28. Alternatively, coupling slot 40 may be series of coupling apertures, in which case the number of coupling apertures may be varied to adjust the coupling.

The auxiliary waveguide 24 may use any of the well known means for establishing a higher dielectric constant than that of the interaction waveguide 14. As one example, shown in FIG. 7 the lossy dielectric 26 described above may comprise a rod 42 of lossy dielectric material, such as, by way of example, Berlox (a mixture of berylium oxide and silicon carbide), attached to adjusting rods 44 and placed within the auxiliary waveguide 24 in axial coincidence with it. The ajusting rods 44 pass through bellows 46 mounted in one wall of the auxiliary waveguide 24. Moving the adjusting rods 44 to displace the dielectric rod 42 from axial coincidence with the auxiliary waveguide 24 reduces the dielectric constant of the waveguide circuit.

Alternatively, dielectric rod 42 may be fabricated of other well known dielectric materials, such as, by way of example, a mixture of alumina and carbon, a mixture of alumina and silicon carbide or a mixture of berylium and silicon carbide. The dielectric material need not be lossy if an optional lossy coating 48 is applied to the inner surfaces of the auxiliary waveguide 24. This optional lossy coating 48 may be any of the well known coatings having radio frequency attenuation properties, such as, by way of example, carbon or Kanthal.

Although the invention may be applied to any gyro-TWT system, it is expected to be particularly effective in systems operating in the Ka (26.5 to 40 GHz) and W (80 to 100 GHz) bands. As an example of a suitable interaction waveguide and interaction waveguide for the Ka band at a frequency of 30 GHz, referring to FIG. 7, a rectangular interaction waveguide 14 having a topwall dimension of approximately 0.5 cm and sideall dimension in the range of 0.4 to 0.45 cm may be either sidwall or topwall coupled to a lossy rectangular auxiliary waveguide 24 having an overall effective dielectric constant of approximately 9.5 with a topwall dimension of approximately 0.16 cm and sidewall dimension in the range of 0.13 to 0.14 cm. The overall effective dielectric constant of the auxiliary waveguide 24 should be at least 3 for normal operation of the invention.

changes in the

It will be understood that various details, materials and arrangements of parts which have been herein described and illustrated in order to explain the nature of the invention may be made by those skilled in the art, within the principle and scope of the invention as expressed in the appended claims.

What is claimed and desired to be secured by Letters Patent of the United States is:

1. In a gyrotron traveling wave tube amplifier incorporating an electron beam rotating at a cyclotron frequency, a frequency-selective stabilization circuit comprising:

an interaction circuit comprising a low-loss primary waveguide having a primary waveguide dielectric constant and a primary waveguide cutoff frequency in the range of a frequency selected from the group of frequencies comprising said electron beam cyclotron frequency and the harmonics of said cyclotron frequency;

an oscillation suppression circuit for said interaction circuit comprising a lossy secondary waveguide having a secondary waveguide dielectric constant differing from said primary waveguide dielectric constant and a secondary waveguide cutoff frequency in the range of said primary waveguide cutoff frequency; and circuit coupling means for coupling said oscillation suppression circuit to said interaction circuit.

2. The stabilization circuit recited in claim 1, wherein said circuit coupling means comprises a waveguide coupling having a coupling factor.

3. The stabilization circuit recited in claim 2, wherein said secondary dielectric constant is larger than said primary dielectric constant.

4. The stabilization circuit recited in claim 3, wherein said waveguide coupling further comprises means for adjusting said coupling factor to cancel parasitic oscillations in the range of said primary waveguide cutoff frequency.

5. The stabilization circuit recited in claim 4, wherein said secondary waveguide further comprises means for adjusting said secondary waveguide dielectric constant.

6. The stabilization circuit recited in claim 5, wherein said secondary waveguide further comprises a lossy coating on the inner surface of said secondary waveguide.

7. The stabilization circuit recited in claim 6, wherein said lossy coating is selected from the group of carbon and Kanthal coating materials.

8. The stabilization circuit recited in claim 7, wherein said secondary waveguide further comprises a dielectric material.

9. The stabilization circuit recited in claim 5, wherein said secondary waveguide further comprises a lossy dielectric material.

10. The stabilization circuit recited in claim 9, wherein said lossy dielectric material is selected from the group of alumina and carbon, alumina and silicon carbide, and berylium oxide and silicon carbide dielectric materials.

11. The stabilization circuit recited in claim 10, wherein said waveguide coupling further comprises a coupling slot between said primary waveguide and said secondary waveguide.

12. The stabilization circuit recited in claim 11, wherein said coupling factor adjustment means comprises means for adjusting the area of said coupling slot.

13. The stabilization circuit recited in claim 12, wherein said lossy dielectric material further comprises a rod of said dielectric within said secondary waveguide having axial coincidence with it.

14. The stabilization circuit recited in claim 13, wherein said dielectric constant adjustment means comprises means for displacing said dielectric rod away from axial coincidence with said secondary waveguide.

15. In a gyrotron traveling wave tube amplifier incorporating an electron beam having an electron beam rotating at a cyclotron frequency, a frequency selective stabilization circuit comprising:

an interaction circuit comprising a low-loss primary waveguide having a primary waveguide dielectric constant and a primary waveguide cutoff frequency in the range of said electron beam cyclotron frequency;

an oscillation suppression circuit for said interaction circuit comprising a Berlox-filled secondary waveguide having a secondary waveguide constant greater than said primary waveguide dielectric constant and a secondary waveguide cutoff frequency in the range of said primary cutoff frequency; and a waveguide coupling between said primary and secondary waveguides including an adjustable coupling slot.

16. In a gyrotron traveling wave tube amplifier incorporating an electron beam having an electron beam cyclotron frequency, a frequency-selective method of suppressing circuit oscillation comprising the steps of:

calibrating a waveguide-type interaction circuit in said amplifier having an interaction circuit dielectric constant to have an interaction circuit cutoff frequency in the range of a frequency selected from the group of said electron beam cyclotron frequency and the harmonics of said cyclotron frequency;

selecting an auxiliary waveguide circuit having an auxiliary circuit dielectric constant greater than said interaction circuit dielectric constant;

calibrating said auxiliary waveguide circuit to have an auxiliary circuit cutoff frequency in the range of said interaction cutoff frequency;

selecting an auxiliary waveguide circuit having an auxiliary circuit dielectric constant greater than said interaction circuit dielectric constant;

calibrating said auxiliary waveguide circuit to have an auxiliary circuit cutoff frequency in the range of said interaction cutoff frequency;

coupling a portion of radio frequency energy from said interaction circuit into said auxiliary circuit; and attenuating said coupled energy in said auxiliary circuit in the range of said auxiliary circuit cutoff frequency.

17. The oscillation suppression method recited in claim 16, wherein said step of selecting an auxiliary waveguide circuit further comprises a selecting an auxiliary waveguide containing a dielectric material.

18. The oscillation suppression method recited in claim 17, wherein said step of attenuating said coupled portion of radio frequency energy in said auxiliary circuit further comprises attenuating said coupled energy in a attenuating material.

19. The oscillation suppression method recited in claim 18, wherein said step of attenuating said portion of radio frequency energy in said auxiliary circuit with an attenuating material further comprises selecting said dielectric material for said attenuating material.

* * * * *